July 6, 1948.                B. MARTIN                  2,444,574
                       STENCIL DECORATING MACHINE
Filed Feb. 22, 1944                              4 Sheets-Sheet 1

INVENTOR.
BY Bradford Martin
Wood, Arey, Herron & Evans
Attorneys

July 6, 1948. B. MARTIN 2,444,574
STENCIL DECORATING MACHINE
Filed Feb. 22, 1944 4 Sheets-Sheet 2

INVENTOR.
Bradford Martin
BY Wood, Arey, Herron & Evans
Attorneys.

July 6, 1948.   B. MARTIN   2,444,574
STENCIL DECORATING MACHINE
Filed Feb. 22, 1944   4 Sheets-Sheet 3
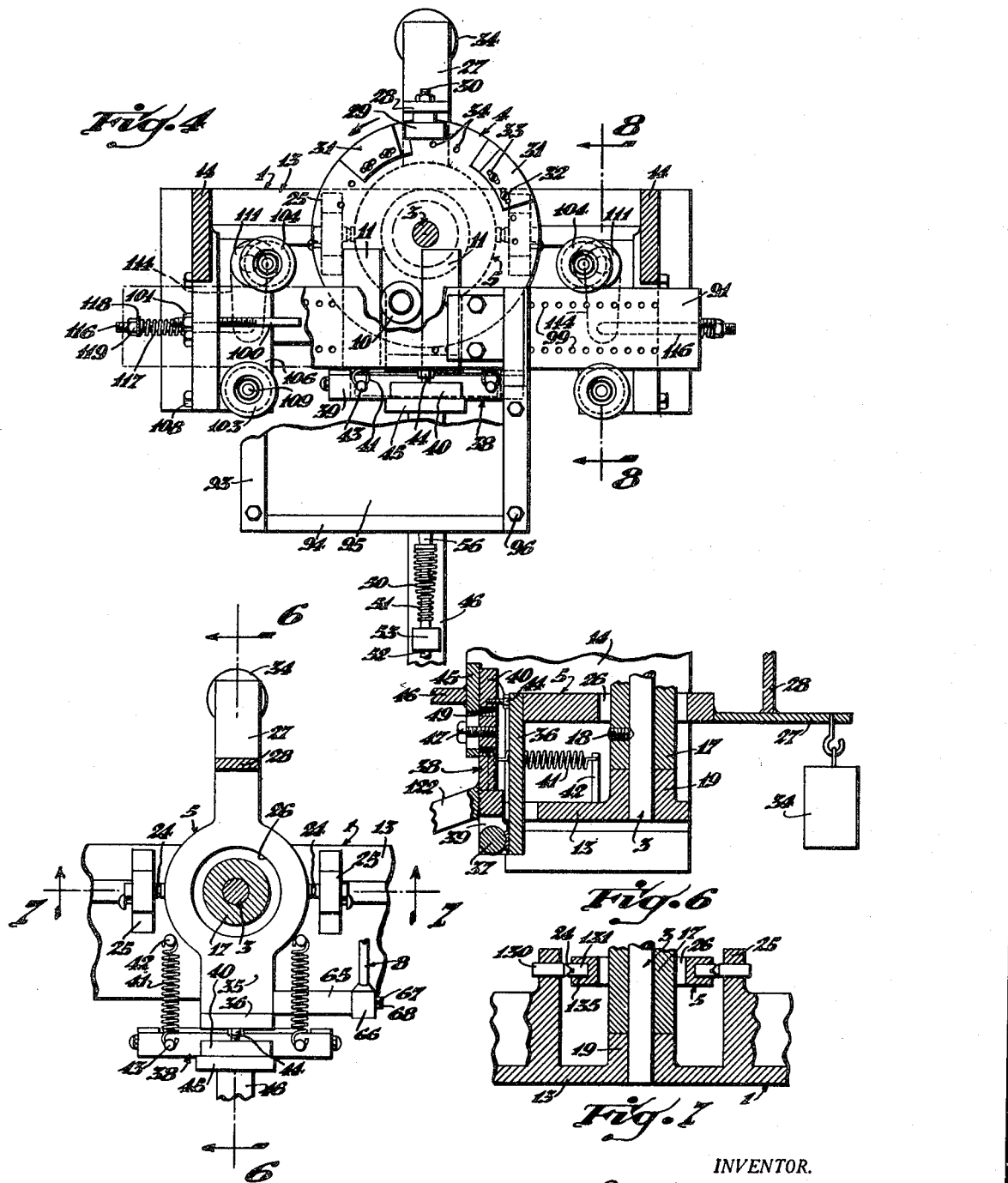
INVENTOR.
Bradford Martin
BY
Wood, Arey, Herron & Evans
Attorneys.

July 6, 1948. B. MARTIN 2,444,574
STENCIL DECORATING MACHINE
Filed Feb. 22, 1944 4 Sheets-Sheet 4

INVENTOR.
Bradford Martin
BY
Wood, Arey, Herron & Evans
Attorneys.

Patented July 6, 1948

2,444,574

UNITED STATES PATENT OFFICE 2,444,574

STENCIL DECORATING MACHINE

Bradford Martin, Washington, Pa., assignor, by mesne assignments, to Solar Engineering & Equipment Co., Beaver, Pa., a corporation of Pennsylvania Application February 22, 1944, Serial No. 523,487

10 Claims. (Cl. 101—124)

This invention relates to stencil decorating machines of the type wherein a coloring material is pressed through a stencil membrane onto the surface of the ware which is being decorated, by means of a squeegee. The stencil membrane is pervious to the coloring material in design areas and elsewhere is impervious so that the design appears upon the ware according to the openwork design upon the stencil.

The principal objective of this invention has been to provide a machine having a chuck in which the operator may insert the ware, and having a lever treadle or power-operated member which when actuated operates the machine for completion of the application of the design. The invention is disclosed in this application in the embodiment of a machine which is suitable particularly for applying designs and identification indicia upon small articles, for instance glassware, vials and ampoules, though it is to be understood that the principles on which the invention is based may be employed for decorating articles of other types and articles of larger size.

One of the principal objectives has been to provide a machine in which the pressure of the squeegee on the stencil and the stencil on the ware is governed so as to be uniform from piece to piece independently of the operator, and a further objective has been to provide a machine in which the squeegee forces decorating composition through the screen as it passes over the screen, first in one direction, then the other. These features have been devised so that longitudinal displacement of the screen which occurs as the squeegee passes over it in one direction is compensated by relative displacement or restoration of the screen when the squeegee passes over it in the return operating stroke.

Another objective has been to provide a stencil decorating machine in which the screen is stationary except for sliding movement in longitudinal back and forth directions while the squeegee approaches the one surface of the screen and the ware approaches the opposite surface of the screen prior to the application of the decoration. Downward pressure of the squeegee on the screen and upward pressure of the ware upon it at the opposite surface are coordinated in timed relationship to one another to provide a sustained high rate of production without undue screen wear.

A still further objective of the present invention contemplates an apparatus in which the ware holding chuck is pivotally mounted so that it may be swung to an open position within which it is readily accessible for loading and unloading, then to an intermediate position prior to the application of the decoration, and then to the position within which the ware is presented to the screen for application of the design. The chuck may be set in either of the first two positions by the operator but the movement to the last is independent of the operator and is governed in accordance with the longitudinal movement of the screen whereby the pressure during decorating is uniform from piece to piece throughout the day.

Briefly, a typical structure in which these improvements are incorporated consists of a frame or base upon which a stencil or, more specifically, a stencil holder is slidable. An assembly including a squeegee is pivotally mounted on the frame above the screen and a work holder is pivotally mounted just below it. A rotatable shaft, extending vertically from the base of the frame, is employed for effecting sliding movement of the screen when the disc is rotated and cams, interconnected through suitable linkage with the squeegee assembly and chuck, effect movement of both toward and from the screen upon disc rotation. The shaft is equipped with a lever which the operator actuates.

In the preferred structure the cam lifts at the disc are separated from one another and when the cam follower is located in between them the squeegee and the work are in engagement with the screen. Thus, when the cam follower engages either cam the squeegee and the work are moved away from the screen in unison whereby operation of the lever in either direction is effective for the application of decorating material. The chuck is movable to a loading position independently of its cam actuated movements.

There are other features and improvements disclosed in the specification which follows in which the drawings, illustrating a typical apparatus of the present invention, are described. From the detailed description and from the foregoing discussion of the principles of the invention those skilled in the art readily will comprehend the various modifications to which it is susceptible.

In the drawings:

Figure 4 is a sectional plan view taken along the line 4—4 of Figure 2.

Figure 5 is a fragmentary sectional plan view taken along the line 5—5 of Figure 2.

Figure 6 is a cross sectional view taken along the line 6—6 of Figure 5.

Figure 7 is a longitudinal sectional view taken along the line 7—7 of Figure 5.

Figure 1:
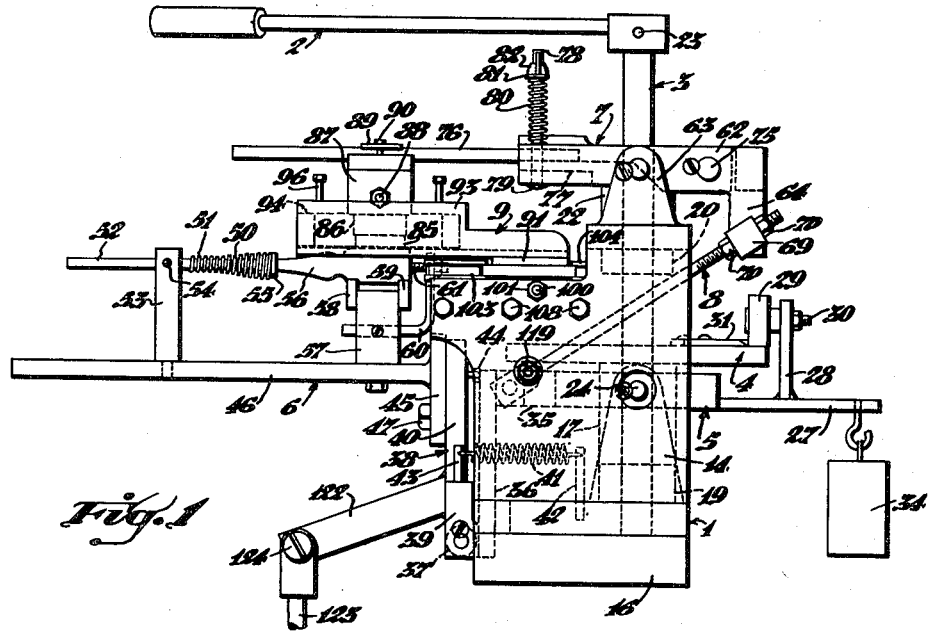
Figure 1 is a side elevational view of a preferred form of the apparatus.

Generally the decorating machine comprises a frame 1, and an actuating handle 2 for rotating a central vertical shaft 3. A cam plate or disc 4 fixed to shaft 3 is adapted to actuate a rocker ring 5 which in turn is pivotally connected to the work holder arm assembly 6. Rocker ring 5 is also operably connected to the squeegee carriage assembly indicated generally at 7 by means of a connecting rod or arm 8. The silk screen carriage assembly 9 is operably connected to the cam disc 4 by means of a roller 10 fixed to the cam disc 4, roller 10 being engaged between blocks 11—11 fixed to the underside of the screen carriage 9. Operation of a treadle mechanism 12 (Figures 11 and 12) moves the work holder outwardly to a position in which it is accessible for insertion and removal of the ware.

Figure 2:
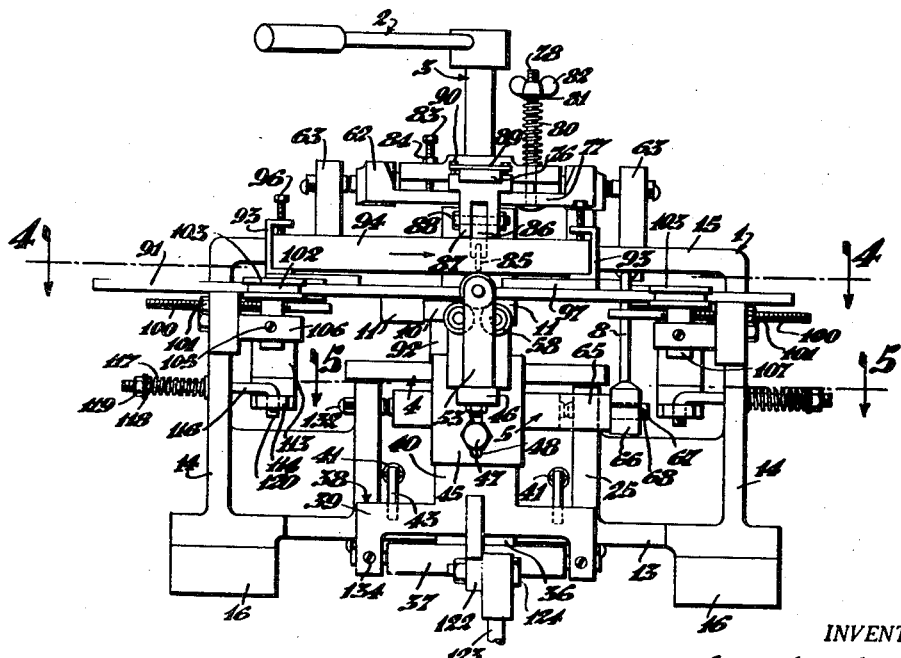
Figure 2 is a front elevational view of the machine as illustrated in Figure 1.
Figure 3:
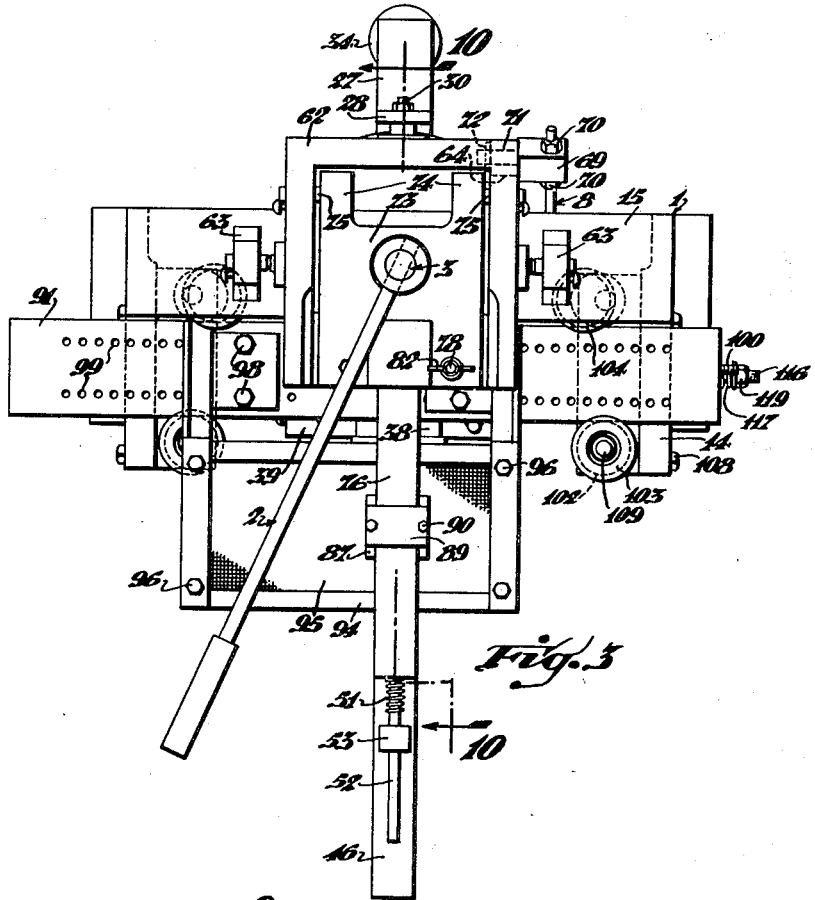
Figure 3 is a top plan view of the decorating machine.

Referring to Figures 1, 2 and 3, the frame 1 is composed generally of a bottom 13, two side walls 14—14 and a top 15, and is preferably made of cast iron or the like. Blocks 16—16 may be fixed across the underside of the ends of the frame to provide the desired spacing of the frame from the table top or work bench (not shown).

The central vertical shaft 3 is held in position by means of a hub or boss 17 on the cam disc 4, the latter being fastened to the shaft 3 by means of the set screw 18. The lower face of boss 17 engages the top face of a boss 19 which extends upwardly from the base 13 of the frame 1. A collar 20 pinned to the shaft 3 as at 21 engages the lower face of the frame top 15 and cooperates with the boss 17 to confine the shaft 3. At its lower extremity the shaft 3 is journalled in the boss 19 while the upper end of the shaft fits within a boss 22 extending upwardly from the top face of the frame top 15. The actuating handle 2 is pinned to the upward extension of the shaft 3 as at 23.

Rocker ring 5 is positioned below the cam disc 4 and is pivoted laterally as at 24—24 between lugs or ears 25—25 extending upwardly from the base 13 of the frame 1. As illustrated best in Figure 5, the central aperture 26 of ring 5 is of sufficient size to completely encircle the boss 17 of the cam disc without engaging the boss even when the ring is rocked or tilted backwardly or forwardly to a considerable degree. An arm 27 fixed to and extending backwardly from the ring 5 carries an upwardly extending arm 28 which in turn carries a roller 29 at the upper end thereof, rotatably journalled on a stub shaft 30.

Cams 31—31 are adjustably fixed to the upper peripheral edge of the cam plate or disc 4 where they may be engaged by roller 29 upon rotation of the shaft 3. The roller, lifted upon engagement with either of the cams 31—31, causes the rocker ring to pivot, the rear portion being moved upwardly and the front portion downwardly. Cams 31—31 are fixed to the disc 4 by means of screws 32 which pass through elongated slots 33 in the cams. Further adjustment of the cams is obtained by providing a series of screw-threaded apertures in the upper face of the disc 4 adapted to be engaged by the screws 32. Thus the cams may be set to any desired position within limits established by the diameter of the disc 4. Roller 29 is held in positive engagement with the cam plate 4 by means of a weight 34 suspended from the rearwardly extending end of arm 27.

As shown in Figures 1, 5 and 6 rocker ring 5 has an arm 35 projecting horizontally forwardly therefrom. An arm 36 drops down from the horizontal support 35 to carry a rod or pivot shaft 37 laterally fixed to the lower end of the front face thereof as by welding. Another arm, indicated generally at 38, extending upwardly from the shaft 37 in substantial parallelism with arm 36 is provided with a bifurcated lower end 39 which is substantially wider than the upper or shank portion 40. The bifurcated end 39 straddles the rod or shaft 37 and is pivotally connected to the ends thereof. Arm 38 is normally held in raised position by means of springs 41—41 connected to studs 42 and 43 fixed to the base 13 of the frame and to the top edges of both sides of the bifurcated section 39 of the arm 38. An adjustable stop screw 44 is threaded into the shank portion 40 adjacent the top edge thereof and contacts the upper edge of arm 36.

An adjustable plate 45, carrying a work holder arm 46, is supported at the front face of the shank portion 40 of arm 38 near the upper edge thereof while a bolt 47 passes through an elongated slot 48 in plate 45 into arm 38. A series of threaded apertures 49 adapted to receive the bolt 47 is provided in arm 38 (Figure 6) to provide additional adjustment for the plate 45 and work holder arm 46. The arm 46 is fixed to the plate 45 as by welding and extends forwardly therefrom in a horizontal position. This construction enables the work support to be set in various positions as dictated by the size or shape of the ware.

The work holder may be of any suitable type, various kinds being known in the prior art. The work holder shown in the drawings is arranged particularly to hold vials or ampoules which are of a fragile nature and it consists of a spring 50 having its forward end 51 considerably smaller in diameter than the end opposite. The end 51 is adapted to be engaged about the one end of a shaft or rod 52 which, in turn, is slidably adjustable in the upper end of a block 53 fixed perpendicularly to work holder arm 46 adjacent the forward end thereof. Rod 52 is substantially parallel to arm 46 and is adjustably held in position by means of the set screw 54. A metal bushing 55 may be inserted in the rearward or enlarged end of the spring 46 and, as best illustrated in Figure 1, the top or neck portion of an ampoule, vial or small bottle 56 is adapted to be inserted through bushing 55 and rotatably journalled therein. Adjacent the rearward end of arm 46 a block 57 is fixed thereto and extends upwardly therefrom to carry sets of rollers 58 and 59 on both sides thereof and spaced so as to rotatably support the body portion of the work (Figures 1 and 2) beneath the screen, as described at a later point in the specification. To locate the work longitudinally an L-shaped adjustable stop 60 held in place in an appropriate aperture in block 57 is utilized. The upper end of the upwardly extending arm of the L stop 60 is traversed by an adjustable screw-threaded stud 61 which is fixed in place by a lock nut. One end of the stud 61 serves to contact the bottom of the glass receptacle 56. Thus the work is rotatably held in position by means of the spring 50, rollers 58 and 59 and stud 61.

The squeegee carriage assembly 7 consists essentially of a U-shaped member 62 which is pivotally supported between lugs or ears 63 extending upwardly from the top 15 of the frame. Member 62 has a downwardly projecting lug 64 on one side of the back thereof, adapted to be connected to a horizontal lug 65 projecting out-when the length of the design is changed substantially.

Figures 11, 12:
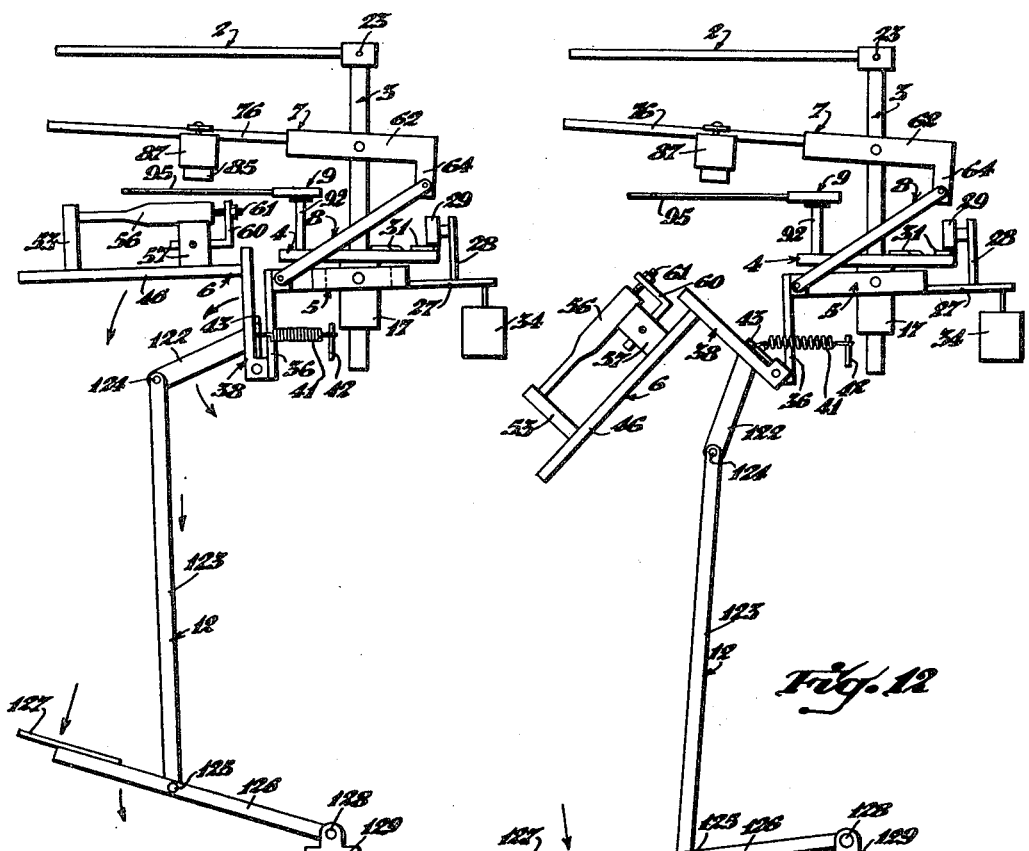
Figures 11 and 12 are diagrammatic views illustrating the operation of the machine.

As illustrated diagrammatically in Figure 12 preessure is applied to the foot pedal 127. This pressure overcomes the spring pressure that normally keeps the work carriage assembly 6 in its up position, and causes the carriage 6 to pivot downwardly. The work 56 is then inserted in the carriage by compressing the spring 50, inserting the work against the stud 67, and allowing bushing 55 carried by the spring to slip over the forwardly projecting end of the work as illustrated in Figure 1. As the pressure upon the treadle is released the springs 41-41 pivot the work carriage assembly 6 upwardly until the stop screw 44 contacts the arm 36.

With decorating composition placed on the stencilling screen in the usual manner, the operator moves the handle 2 through an arc until it contacts a stop 100 on the side of the machine toward which the handle is being moved. One complete stencilling job is thus completed. This sequence is as follows: As the handle is actuated, shaft 3 rotates the cam disc 4, causing cam 31 to move from its position beneath the roller 29; the roller thus drops to the upper surface of the disc 4 and traverses this surface until the opposite cam 31 is reached. When the roller is lowered upon leaving the cam, the rear portion of the rocker ring is likewise lowered and the forward portion raised. The work 56 therefore is raised to a position where it contacts the lower surface of the stencilling screen 95, and by means of the connecting rod 8, the squeegee carriage mechanism is consequently lowered causing the squeegee to contact the upper surface of the stencilling screen. As the disc 4 is being revolved, the roller 10 journalled on the stud 92 which is fixed to the forward portion of the disc, moves the screen carriage 9 across the machine in the same general direction as the rotation of the handle. The design on the screen passes between the squeegee and the work and stencils the design on the work. During the decorating operation the work is rotated by friction.

As previously described, plate 73, carrying the squeegee arm 74, is pivotally fixed to the U-shaped member 63 at its rear end and flexibly connected to it at its forward end by means of the spring 80. This allows the squeegee to have a flexible contact with the screen, and provides for any irregularities in the contour of the work. Further provision for such irregularities is made by having the squeegee carrying member 86 pivotally connected to the bracket 87.

As the handle 2 is being advanced, the roller 29 approaches and eventually traverses the cam 31 on the opposite side of the disc, when the stencilling operation is completed, to lower the work holder arm 46 and raise the squeegee arm 74. The rotation will terminate upon contact of a block 11 with a stop 100, and the treadle may then be depressed, the stencilled work removed, and another piece of work inserted in the carriage.

A series of steps the same as those just described occurs upon operation of the lever in an opposite direction.

It has been found that the stencilling screen is much more durable and gives better results if the direction of the rotation is reversed after each operation. This prevents any warping or distortion of the screen design which would occur if the squeegee were continually wiped over the screen in one direction.

Having described my invention, I claim:

1. A machine for stencil decorating, comprising a base having a stencil slidable thereon in back and forth directions, a work carrier pivotally mounted for swinging movement toward and from said stencil at one face thereof, an assembly, including a squeegee pivotally mounted for swinging movement toward and from said stencil at the opposite face thereof, said squeegee and work carrier being cross connected for movement in unison toward and from said stencil, and the pivotal points of said squeegee and work holder being so arranged in relation to their balance that they act as mutual counterweights, a rotatable shaft which is offset to one side of said stencil and which has a member coupled with said stencil for effecting sliding movements thereof when the shaft is rotated, cam members spaced apart from one another and carried by said shaft, a follower for said cam members, and means interconnecting said follower with said work holder and said squeegee whereby they are swung away from said stencil in unison when the follower is in engagement with either of said cams.

2. A stencil decorating machine, comprising a base, a stencil slidable upon said base, a squeegee pivotally mounted on said base for swinging movement toward one face of the stencil, a work holder pivotally mounted on said base for swinging movement toward the opposite face of said stencil, means interconnecting said squeegee and work holder for movement thereof in unison toward and from said stencil, the pivotal points of said squeegee and work holder being offset from the axes of balance thereof such that the work holder and squeegee act as mutual counterweights, rotatable means for moving said stencil in opposite directions, cam means associated with said rotatable means, and means mechanically interconnecting said cam means with said squeegee and said work holder whereby they are moved toward and from said stencil in unison when said rotatable means is operated.

3. A stencil decorating machine, comprising a base, a stencil slidable upon said base, a squeegee pivotally mounted for movement toward one face of said stencil, an assembly including a work holder mounted for movement toward the opposite face of said stencil, said work holder being independently pivotally mounted in said assembly and movable therefrom to a loading position, a rotatable shaft having means thereon for reciprocating said stencil when said shaft is rotated in opposite directions, cam means carried by said shaft, and a mechanical linkage interconnecting said squeegee and work holder with said cam means for movement of the squeegee and work holder in unison toward and from said stencil when said shaft is rotated and said stencil is moved in back and forth directions, the pivotal points of said work holder and squeegee being so arranged in relation to their balance that they act as counterweights for one another.

4. A stencil decorating machine, comprising a base, a stencil slidable upon said base, a holder pivotally mounted on said base for swinging movement toward and from said stencil, said holder having a squeegee associated therewith for engagement with one face of said stencil, another holder pivotally mounted on said base at the opposite side of said stencil for swinging movement toward and from said stencil and having a chuck for supporting ware in engagement with an opposite face of said stencil, both of said holders being pivotally mounted in unbalanced posiwardly from the front of the rocker ring 5 by means of the actuating rod or arm 8. An enlarged head 66 fixed to the forward end of arm 8 is pivotally connected to a stud 67 extending outwardly from the lug 65 and is held in place by means of a pin 68. A block 69 is adjustably held in place on the rearwardly projecting end of rod 8 by means of lock nuts 70—70 and is pivotally connected to lug 64 by means of a stud 71 extending from block 69 and passing through the lug 64. A pin 72 confines the stud 71 in place.

As shown in Figure 3, a plate 73, inserted internally of the U-shaped member 63, has lugs 74—74 at its rear end which are connected pivotally to the member 63 adjacent the rear end thereof as at 75—75. The front end of plate 73 has an arm 76 extending forwardly therefrom in substantial parallelism with the arm 46. A web 77 joins the lower forward edges of the U-shaped member 62 and carries a headed stud 78 the head of which is positioned to engage the underside of web 77, with stud 78 passing upwardly through the web and plate 73 and extending beyond the plate to carry a compression spring 80. The upper end of stud 78 is threaded to carry a washer 81 and a butterfly nut 82 to adjust the spring compression. As illustrated in Figure 2 a set screw 83 provided with a lock nut 84 traverses the upper plate 73 and engages the upper surface of web 77 to limit the movement of the squeegee carrying arm 76.

Squeegee 85 is inserted in the slotted lower extremity of the squeegee carrying member 86, the latter, in turn, being pivotally attached within the bifurcated lower end of the bracket 87 by means of the bolt 88. Bracket 87 is adjustably fixed to arm 76 by means of a plate 89 which straddles the arm and is bolted to the bracket as at 90. This construction enables the squeegee to accommodate itself to minor undulations in the surface of the ware.

Screen carriage assembly 9 consists essentially of an elongated plate 91 which is reciprocated upon rotation of the shaft 3, by means of the roller 10. The roller is journalled in a boss 92 extending upwardly from the cam plate 4 toward the front peripheral edge thereof and rides in a track formed by the blocks 11—11 fixed to the underside of the elongated plate 91. Plate 91 carries a pair of inwardly facing adjustable channel irons 93—93 extending diagonally forwardly therefrom and adapted to receive the screen frame 94 held in position through set screws 96. The stencil screen 95, which is pervious in design areas, is stretched tautly over the frame 94 in the usual manner. The channel irons 93—93 are fixed to bracket plates 97 as by welding and plates 97 are adjustably fixed to plate 91 by means of the bolts 98 which are adapted to pass through bracket plates 97 into threaded bores 99 provided in longitudinal rows adjacent the front and rear edges of the plate 91.

Referring to Figure 2, adjustable stops 100—100 are provided to limit the stroke or reciprocating movement of the screen carriage assembly 9. Stops 100—100 are preferably elongated studs threaded through the side walls 14—14 of the frame 1 and having their inwardly projecting ends adapted to be contacted by the blocks 11—11. Lock nuts 101—101 are provided to hold the stops in set position. Stops 100—100 are set to correspond with the setting of the cams 31—31 in the cam disc 4, the setting being such that when the roller 24 traverses one cam a block 11 will contact the corresponding stop 100 to terminate the stroke. As the handle is moved in the opposite direction and the roller 29 traverses the other cam the block 11 on the opposite side of the plate 91 will again contact a corresponding stop 100 to limit the stroke.

Figure 8:
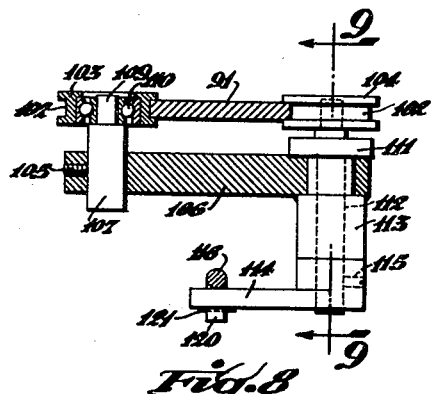
Figure 8 is a cross sectional view taken along the line 8—8 of Figure 4.
Figure 9:
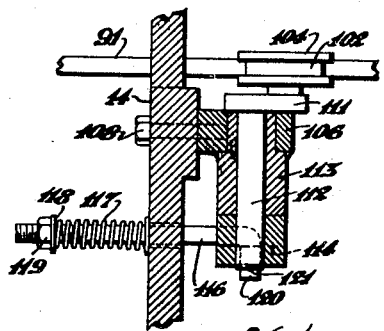
Figure 9 is a sectional view taken along the line 9—9 of Figure 8.
Figure 10:
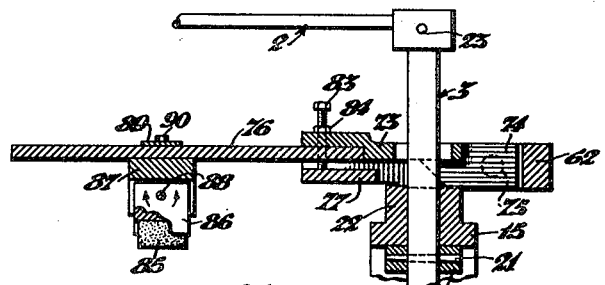
Figure 10 is a fragmentary cross sectional view taken along the line 10—10 of Figure 3.

A track for the elongated plate 91 is provided by the annular grooves 102 in the circumferential faces of front and back pairs of rollers 103 and 104 respectively. Referring to Figures 8 and 9, a front roller 103 is adjustable only in an up and down direction by means of a set screw 105 which is screw-threaded into the forward edge of a block 106 and contacts the stub shaft 107 carrying the roller. Blocks 106 which carry the stub shafts are bolted to the side walls 14 of the frame as at 108. The upper end of the stub shaft 108 is counterturned as at 109 and carries the roller 103 journalled on ball bearings 110. Back rollers 104 of this assembly are mounted on eccentrics 111 near the outer periphery thereof on ball bearings in a manner similar to the mounting of the front rollers, and a shaft 112 extending downwardly from the underside of the eccentric, as shown in Figure 9, passes through a bushing 113 fixed in the block 106 to support a bell crank at its lower end. One arm 114 of the bell crank is fixed to the shaft 112 by means of a set screw as at 115 and extends forwardly therefrom. The other arm 116 extends outwardly through the wall 14 of the frame and carries a compression spring 117 held in place between the wall 14 and a washer 118 by means of a nut 119. The inner end of arm 116 is turned downwardly and pivotally joined to the forward end of arm 114 as at 120 and is held in place by a pin 121 and thus the back rollers are constantly being urged against the rear edge of the carriage plate 91 and hold it firmly against the forward pair of rollers 103.

The treadle mechanism 12 consists of an arm 122 fixed to the front face of the bifurcated arm 40 and is pivotally joined to a link 123 as at 124. Link 124 is pivotally connected at 125 to an arm 126 carrying the foot pedal 127 at the forward end thereof and pivotally joined at 128 to a fixed bracket 129 at its rearward end.

Trunnions 130 and 131, as illustrated in Figure 7 in connection with the rocker ring 5, may be used for pivotally connecting arms 36 and 38, as well as other pivotal connections described in connection with the U-shaped member 63 and plate 73 of the squeegee mechanism 7. Trunnion 130 is adjusted by means of an adjusting screw 132 (Figures 1 and 2) and is held in position by a set screw 133. Trunnion 134 is inserted in a bore 135 provided in the ring 5.

When the stencilling operation is not being performed the operating parts of the machine are in the position as shown diagrammatically in Figure 11. The roller 29 rests on one of the cams 31 which raises the rear portion of the rocker ring 5 and lowers the forward portion. The work carrying arm 46 is therefore lowered and the squeegee carrying arm 74 is raised by means of the connector rod 8.

To put the machine in operation the channels 93—93 are adjusted on the carriage plate 91 in the manner previously described to accommodate the screen frame 94 carrying the stencilling screen 95. Frame 94 is then inserted and fastened by means of the set screws 96. Cams 31—31 may be adjusted at this time, if necessary, along with the stop studs 100—100. These adjustments are governed by the length of the design to be stencilled on the ware and need be performed only tions such that both are biased, by their unbalance toward said stencil, means including a rotatable shaft for reciprocating said stencil, and means for operating said squeegee holder and said chuck holder in unison toward and from said stencil, including a pair of cams spaced apart from one another and connected with said shaft, and a follower for said cams having connections therefrom to said respective holders.

5. A stencil decorating machine, comprising a base, a stencil slidable upon said base, a squeegee pivotally mounted on said base for swinging movement toward and from one face of said stencil for stencilling engagement therewith, a chuck pivotally mounted on said base for swinging movement toward and from the opposite face of said stencil to support ware in engagement therewith, said squeegee and chuck being mounted in unbalanced position for biasing said squeegee and said chuck toward said stencil, means including a rotatable shaft for reciprocating said stencil, and means for operating said squeegee and said chuck in unison toward and from said stencil, including a pair of cams spaced apart from one another and connected with said shaft, and a follower with said cams having respective connections therefrom to said squeegee and said chuck.

6. A stencil decorating machine, comprising a base, a stencil slidable upon said base, a holder mounted on said base for movement toward and from said stencil, said holder having a squeegee independently resiliently associated therewith for engagement of said stencil, a rotatable shaft, a ring surrounding said shaft and pivotally mounted on said base, a work holder supported from said ring and having a chuck for supporting ware in engagement with said stencil opposite said squeegee, means biasing said squeegee and said work holder toward said stencil, means including said rotatable shaft for reciprocating said stencil, and means for operating said squeegee and said work holder in unison toward and from said stencil, said means including a pair of cams spaced apart from one another and connected with said shaft, and a follower with said cams having respective connections therefrom to said squeegee and said work holder.

7. A stencil decorating machine, comprising a frame, a stencil member slidable upon said frame, an assembly including a squeegee engageable with one face of said frame and comprising a first member pivotally associated with said frame and a second member, carrying said squeegee, independently pivotally associated with said first member, a holder including a chuck adapted to hold work in engagement with said stencil at the face thereof opposite the face engaged by the squeegee and comprising a supporting member pivotally mounted on said frame, means including a rotatable shaft having a drive member thereon for reciprocating said stencil upon rotation of said shaft in opposite directions and cam means for effecting movement of said squeegee and said chuck in unison toward and from said stencil as said stencil is reciprocated, said squeegee and assembly for said holder being mounted in unbalanced positions such that the squeegee and holder act as mutual counterweights for one another.

8. A stencil decorating machine, comprising a frame, a stencil member slidable upon said frame, an assembly including a squeegee engageable with one face of said frame and comprising a first member pivotally associated with said frame and a second member, which carries said squeegee, independently pivotally associated with said first member, a chuck adapted to hold work in engagement with said stencil at the face thereof opposite the face engaged by the squeegee, means pivotally mounted on said frame for supporting said chuck, means including a rotatable shaft having a drive member thereon for reciprocating said stencil upon rotation of said shaft in opposite directions, and cam means driven by said shaft for effecting movement of said squeegee and said chuck support in unison toward and from said stencil as said stencil is reciprocated, said squeegee and assembly for said holder being mounted in unbalanced positions such that the squeegee and holder act as mutual counterweights for one another.

9. A stencilling machine, comprising a frame, a stencil member slidably mounted on said frame, a first assembly pivotally mounted on said frame at one side of said stencil, said assembly including a chuck which is pivotally mounted on said assembly and which is independently movable to a loading position and to an intermediate position, the pivotal movement of said assembly causing further movement of said chuck from the intermediate position into engagement with said stencil, a second assembly including a squeegee pivotally mounted on said frame for movement of said squeegee toward and from the opposite face of said stencil, means for reciprocating said stencil including a rotatable shaft, cam means associated with said shaft, a follower for said cam means, and connections between said follower respectively to said first assembly and said second assembly through which said chuck and squeegee are moved in unison with one another toward and from said stencil as said stencil is reciprocated.

10. A stencilling machine comprising a frame, a stencil member, roller means supported from the frame embracing the opposite sidewise edges of said stencil member for guiding it through movements in back and forth directions, a squeegee movable into and out of engagement with one face of said stencil member, a chuck mounted at the other side of said stencil and means for moving said chuck and squeegee into simultaneous engagement with said stencil and for operating said stencil comprising a shaft having drive means thereon in connection with said stencil and having cam means thereon in connection with said squeegee and said work holder, the squeegee and holder being mounted in unbalanced positions such that they are mutually biased toward said stencil and act as mutual counterweights for one another through said cam means which is in connection with said squeegee and said holder.

BRADFORD MARTIN.

REFERENCES CITED

The following references are of record in the file of this patent:

UNITED STATES PATENTS

| Number | Name | Date |
|---|---|---|
| 2,153,435 | Schneider | Apr. 4, 1939 |
| 2,231,535 | Jackson | Feb. 11, 1941 |
| 2,355,930 | Thorne | Aug. 15, 1944 |